United States Patent [19]

Fong

[11] 4,270,990

[45] Jun. 2, 1981

[54] ACIDIC ELECTROPLATING BATHS WITH NOVEL SURFACTANTS

[75] Inventor: Jaan J. Fong, Woodbury, Minn.

[73] Assignee: Minnesota Mining and Manufacturing Company, Saint Paul, Minn.

[21] Appl. No.: 46,378

[22] Filed: Jun. 7, 1979

[51] Int. Cl.³ .................. C25D 3/22; C25D 3/32; C25D 3/38
[52] U.S. Cl. .................. 204/55 R; 204/49; 204/50 R; 204/52 R; 204/53; 264/54 R; 264/DIG. 2
[58] Field of Search ............ 204/51 R, 53, 54 R, 204/55 R, DIG. 2, 49, 50 R, 52 R

[56] References Cited

U.S. PATENT DOCUMENTS

| | | | |
|---|---|---|---|
| 3,855,085 | 12/1974 | Derek | 204/55 R |
| 4,061,547 | 12/1977 | Rosenberg | 204/54 R |
| 4,137,133 | 1/1979 | Arcilesi | 204/55 R |
| 4,162,947 | 7/1979 | Canaris | 204/55 R |

*Primary Examiner*—F. C. Edmundson
*Attorney, Agent, or Firm*—Cruzan Alexander; Donald M. Sell; Gerald F. Chernivec

[57] ABSTRACT

An acidic electroplating bath containing, as a surfactant, a compound of the formula:

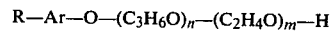

$$R-Ar-O-(C_3H_6O)_n-(C_2H_4O)_m-H$$

wherein R is at least one halide, aldehyde, amine, carboxyl, ketone or mixture thereof, Ar is benzene or naphthalene, n is from zero to 10, m is from zero to 100, and m+n is greater than zero.

2 Claims, No Drawings

ACIDIC ELECTROPLATING BATHS WITH NOVEL SURFACTANTS

BACKGROUND OF THE INVENTION

This invention relates to acidic electroplating baths, and more specifically to a novel surfactant component for use therein.

In past years, some of the most widely accepted commercial electroplating baths have utilized a cyanide electrolyte. While such baths were highly effective for the electrodeposition of various metals, such also presented significant problems, not the least of which was the toxicity and difficulty of waste disposal unless expensive waste treatment equipment was employed.

To overcome many of the objectionable features of cyanide-based baths, sulfate or chloride electrolytes were proposed, as disclosed, for example, for zinc electroplating baths in U.S. Pat. Nos. 3,729,394; 3,594,291; 3,694,330; and 3,855,085.

In acidic electroplating baths, it is conventional to utilize a surfactant therein to control properties of the metallic deposit, and to assist in solubilizing other organic components. Many such surfactants are commercially available polyethylene oxide-based materials, and as such typically contain a hydrophilic and hydrophobic portion within their chemical structure. The hydrophobic portion of the surfactant, typically an aliphatic hydrocarbon, is undesirable as it can cause problems relative to the metallic deposit, such as blistering, discoloration upon heating, and a reduction in ductility.

While it would be desirable to eliminate the unwanted hydrophobic portion from the surfactant, and possibly replace same with more desirable functional groups, such has not heretofore been available.

It has now been observed that surfactants exhibiting superior properties over previously commercially available materials can be prepared to avoid the aforementioned problems relative to the metallic deposit.

SUMMARY OF THE INVENTION

In accordance with the invention, there is provided an acidic electroplating bath comprising metal ions, an electrolyte, and at least one compound of the formula:

$$R-Ar-O-(C_3H_6O)_n-(C_2H_4O)_m-H$$

wherein R is selected from the group consisting of halide, aldehyde, amine, carboxyl, ketone and mixtures thereof, Ar is benzene or naphthalene, n is from zero to 10, m is from zero to 100, and m+n is greater than zero.

The compound functions as a surfactant, and in some instances aids in brightening the resultant metallic deposit, and exhibits superior properties over previously known surfactants.

DETAILED DESCRIPTION OF THE INVENTION

Acid electroplating baths typically contain metal ions to be plated, e.g. zinc, cadmium, tin, etc., and electrolytes to impart conductivity to the bath, e.g. soluble salts of hydrochloric acid, sulfuric acid, fluoboric acid, mixtures thereof, etc.

Additionally, other components are typically utilized in acidic electroplating baths, e.g. surfactants, organic acids, brighteners, etc.

The surfactant utilized in my invention can be depicted by the formula:

$$R-Ar-O-(C_3H_6O)_n-(C_2H_4O)_m-H$$

where R is selected from the group consisting of at least one halide, aldehyde, amine, carboxyl, ketone, and mixtures thereof; n is from zero to 10, m is from zero to 100, m+n is greater than zero; and Ar is benzene or naphthalene.

The surfactants of my invention can be prepared by simple addition reactions. Ethylene oxide and propylene oxide are characterized by high reactivity. The three-membered ring is under great strain and can be readily opened. Therefore, either ethylene oxide or propylene oxide can be easily added to compounds having an active hydrogen atom.

An example of the reaction sequence is as follows:

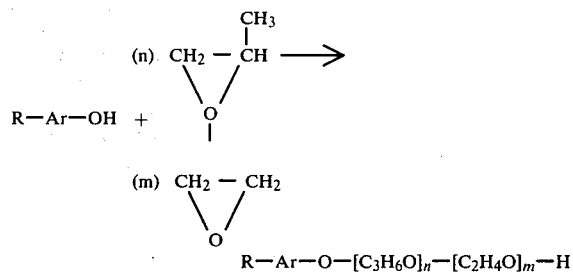

The corresponding phenol or naphthol and a catalyst for the addition reaction (any basic material, e.g., potassium hydroxide) can be simply charged to a reaction vessel, following which ethylene oxide and/or propylene oxide addition is begun. The exothermic reaction will proceed until addition is complete.

It should be noted that acidic electroplating baths typically contain primary brighteners, e.g. polyethylene oxide adducts with organic materials, and secondary brighteners, e.g. aldehydes or ketones. When the surfactant component above is prepared with R being, e.g. an aldehyde or ketone group, the compound inherently contains these secondary brighteners.

A bath of the present invention utilizing the defined surfactant, can be effectively operated within conventional acid electroplating parameters. For example, in zinc plating with a chloride electrolyte, the optimum pH range is about 5.0 to 5.5. At lower pH's, plating efficiency of the bath is reduced, and at higher pH's, there may be a tendency to precipitate zinc hydroxy salts, adhesion of the deposit on the cathode becomes relatively poor, and some burning may be noted. For sulfate or fluoborate electrolytes, such as for cadmium, tin, and tin/lead electroplating, very low pH's, e.g. about 0.5 to 1.5, produce excellent deposits.

A bath operating temperature range of from about 15° C. to about 45° C. has been found to function satisfactorily. Reduced temperatures may approach the solubility limits of bath components. Increased temperatures may cause hazy deposits on the cathode, and also may exceed the cloud point of bath components, particularly if polyoxyalkylated surfactants, in the conventional sense, are utilized in conjunction with my surfactant.

The invention will now be further illustrated by the following non-limiting specific examples, wherein grams per liter is the concentration unless otherwise indicated.

In all of the zinc electroplating baths of the following examples, testing was undertaken utilizing a conventional 267-milliliter hull cell under 2 amperes of current for five minutes. The bath was not agitated and temperatures were maintained at from 21° C. to 26° C., with the pH of the solution being maintained from 4.8 to 5.8, with an optimum at 5.4. In all cases, water was added to the bath to make one liter of solution.

In the case of tin and cadmium electroplating examples, all conditions were duplicated, except that the pH was approximately 1.0 due to the high sulfuric acid concentration.

EXAMPLE 1

In a metal pressure reactor, 48.2 grams of orthochlorophenol and 1.77 grams of powdered potassium hydroxide were added, followed by heating the reactor to 120° C. Ethylene oxide addition was initiated, at which time the reaction mixture exothermed to 140° C. Addition was maintained over a period of 4 hours at 140° C. to 150° C. and 20 pounds per square inch pressure until 660 grams of ethyelene oxide were added. After addition was complete, the reactor temperature was maintained at 140° C. for one hour. The resultant product had the formula:

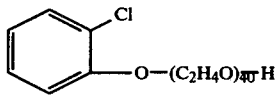

An electroplating bath was prepared by mixing the following, based on grams per liter:

| | |
|---|---|
| Zinc chloride | 55 |
| potassium chloride | 225 |
| boric acid | 30 |
| compound as formed above | 3 |
| Selogen AF (tradename for a sodium salt of a sulfonated naphthalene condensate, commercially available from Diamond Shamrock) | 1.13 |
| Monateric CY-3A (tradename for (2-Capri-1-Aminoethyl) imidazoline quaternary salt, commercially available from Mona Industries) | 0.75 |
| DL - Alanine (tradename for an amino acid, CH$_3$CHNH$_2$COOH) | 5.64 |
| Benzoic acid | 1.50 |
| o-chlorobenzaldehyde | 0.125 |

The zinc deposited on the cathode was fully bright over a current density range of from 0.1 to 9.5 amperes per square decimeter (ASD). At densities greater than 9.5 ASD, the deposit was black and soft. The bright deposit was very ductile and exhibited no discoloration or cloudiness (sometimes known as blushing) after heating at 190° for 2 hours.

EXAMPLE 2

An electroplating bath utilizing the compound

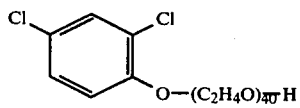

(prepared as per Example 1) was prepared by mixing the following, on a gram per liter basis:

| | |
|---|---|
| Zinc chloride | 55 |
| Potassium Chloride | 225 |
| Boric acid | 30 |
| Above compound | 5.25 |
| Selogen AF | 1.13 |
| Monateric CY-3A | 0.75 |
| DL - Alanine | 5.63 |
| Benzoic acid | 1.50 |
| o-chlorobenzaldehyde | 0.125 |

The zinc deposit was brilliant from 0.1 to 10 ASD. A slight amount of pitting was noted at current densities between 5 and 10 ASD. The deposit again was ductile and did not exhibit blushing when heated.

EXAMPLE 3

A zinc electroplating solution utilizing the compound

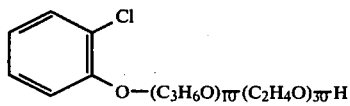

(prepared as per Example 1) was prepared by mixing the following:

| | |
|---|---|
| Zinc chloride | 55 |
| Potassium chloride | 225 |
| Boric acid | 30 |
| Above compound | 9.5 |
| Selogen AF | 1.13 |
| Monateric CY-3A | 0.75 |
| DL - Alanine | 5.63 |
| Benzoic acid | 1.50 |
| o-chlorobenzaldehyde | 0.125 |

The zinc deposit was brilliant from 0.1 to 10 ASD. Some slight streaks were noted at current densities between 4 and 10 ASD. The deposit was ductile and did not blush when heated at elevated temperatures.

EXAMPLE 4

When the Selogen AF, Monateric CY-3A and DL-Analine were eliminated from Example 3, the zinc deposits were bright from 0.1 to 3.5 ASD and semi-bright between current densities of 3.5 and 10 ASD.

EXAMPLE 5

Example 2 was repeated with the exception that the zinc chloride concentration was increased to 110 grams per liter.

The zinc deposit was brilliant overall from a current density of between 0.1 to 12.0 ASD, and the deposit was smooth and free of pitting at elevated current density areas.

EXAMPLE 6

An electroplating solution was prepared by mixing:

| | |
|---|---|
| zinc chloride | 31 |
| potassium chloride | 225 |

| -continued | |
|---|---|
| boric acid | 30 |
| Amidox - C-5, (tradename for a polyethoxylated coconut acid monoethanolamide, commercially available from the Stepan Chemical Company) | 2.81 |
| Surfactant from Example 1 | 3.0 |
| Selogen AF | 1.13 |
| Monateric CY-3A | 0.75 |
| DL - Alanine | 5.63 |
| Benzoic acid | 1.5 |
| Benzylidene Acetone | 0.125 |

The zinc deposit was brilliant from current densities of 0.1 to 10 ASD, with slight streaks noted between 4 and 10 ASD.

EXAMPLE 7

A compound was formed as per Example 1 having the formula:

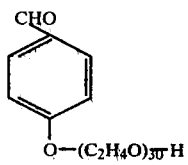

On a per liter basis, 4.5 grams of this compound were mixed with:

| Zinc chloride | 71 |
|---|---|
| Potassium chloride | 225 |
| boric acid | 26 |
| pH | 5.5 |

A bright deposit was found at current densities of from 1.5 to 10 ASD. At from 1.2 to 1.5 ASD, a slight haziness was noted.

EXAMPLE 8

Other ethoxylated aldehydes manufactured in accordance with Example 1 and substituted for that of Example 7 were:

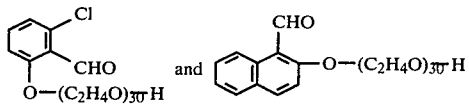

Results similar to those of Example 7 were obtained.

EXAMPLE 9

A cadmium electroplating bath using the compound of Example 3 was prepared by mixing the following components, on a gram per liter basis:

| Compound from Example 3 | 4 |
|---|---|
| Cadmium Oxide | 30 |
| 66° Be′ Sulfuric acid | 80ml |
| Selogen AF | 2.4 |
| Orthochlorobenzaldehyde | 0.6 |

A bright cadmium deposit was obtained at current densities from 0.01 to 9.0 ASD.

EXAMPLE 10

A tin electroplating bath using the compound of Example 1 was prepared according to the following composition on a per liter basis:

| Compound of Example 1 | 6 |
|---|---|
| 66° Be′ sulfuric acid | 105ml |
| Stannous sulfate | 30 |
| MIRANOL C2M-TEA (imidazoline derivative from Miranol Chemical Co.) | 1.2 |
| Benzylidene acetone | 0.2 |

A full bright tin deposit was obtained from 0.01 to 9.0 ASD.

What is claimed is:

1. An acidic electroplating bath comprising metal ions, an electrolyte, and at least one compound of the formula:

$$R-Ar-O-(C_3H_6O)_n-(C_2H_4O)_m-H$$

wherein Ar is benzene or naphthalene; R is selected from the group consisting of at least one halide, amine, carboxyl, ketone and mixtures thereof; n is from zero to 10, m is from zero to 100, and m+n is greater than zero.

2. The electroplating bath of claim 1 wherein said metal ions are zinc ions and said electrolyte comprises a chloride salt.

* * * * *